United States Patent [19]
Lamminen et al.

[11] Patent Number: 6,000,631
[45] Date of Patent: Dec. 14, 1999

[54] CURVED FLEXIBLE VEHICLE WASH SPRAY ARCH

[75] Inventors: Olli Lamminen; Pasi Kaipainen, both of Ann Arbor, Mich.

[73] Assignee: InterClean Equipment, Inc., Ann Arbor, Mich.

[21] Appl. No.: 09/044,053

[22] Filed: Mar. 18, 1998

[51] Int. Cl.⁶ ............................................. B05B 15/06
[52] U.S. Cl. ....................... 239/200; 239/273; 239/550; 134/123
[58] Field of Search .................... 239/200, 207, 239/550, 566, 567, 266–269, 273, 276; 134/123

[56] References Cited

U.S. PATENT DOCUMENTS

| | | | |
|---|---|---|---|
| 2,221,876 | 11/1940 | Mackin . | |
| 2,754,834 | 7/1956 | Merancy et al. | 134/123 X |
| 2,756,759 | 7/1956 | Swain | 239/550 X |
| 2,788,009 | 4/1957 | Lones | 134/123 X |
| 3,072,131 | 1/1963 | Laurenzio | 134/123 |
| 3,259,138 | 7/1966 | Heinicke . | |
| 3,378,018 | 4/1968 | Lawter . | |
| 4,920,997 | 5/1990 | Vetter et al. . | |
| 5,020,556 | 6/1991 | Lamminen et al. . | |
| 5,498,329 | 3/1996 | Lamminen et al. . | |

FOREIGN PATENT DOCUMENTS 512466 7/1952 Belgium ................................ 134/123

Primary Examiner—Lesley D. Morris
Attorney, Agent, or Firm—Harness, Dickey & Pierce, P.L.C.

[57] ABSTRACT

A spray arch for a vehicle wash system having a pair of side supports and a continuously curved pipe extending upward above the side supports and over the path of travel for a vehicle being washed. The arch is preferably made of a flexible PVC pipe that is hand-manipulated to the curved position spanning over the path of travel and held in this shape by the side supports. Spray nozzles on the pipe all extend radially inward such that all nozzles are directed toward a vehicle beneath the arch regardless of the size of the vehicle.

13 Claims, 2 Drawing Sheets

CURVED FLEXIBLE VEHICLE WASH SPRAY ARCH

BACKGROUND AND SUMMARY OF THE INVENTION

The present invention relates to a spray arch for a vehicle wash system and in particular an arch that is mounted to a pair of side supports and continuously curved upward and over the path of travel of a vehicle being washed. Preferably the arch is made of a flexible conduit or pipe that is hand manipulated to the curved position spanning over the vehicle path and held in place by the side supports.

Automated vehicle wash systems typically include one or more spray arches spanning over a path along which vehicles being washed travel. The arches are typically of a rectangular shape having a pair of vertical side supports extending upward from the wash floor and a generally horizontal crossbar at the top of the side supports, extending over the vehicle path. While such a rectangular arch provides adequate clearance for many shapes and sizes of vehicles, a short vehicle will not receive any benefit from the spray nozzles located at the upper ends of the supports. These nozzles will spray horizontally over the vehicle. These nozzles are only useful in washing the upper portion of a larger vehicle such as a van. The water, soap and other chemicals discharged from these upper nozzles when washing a small vehicle are largely wasted.

To avoid the waste of water and chemicals, the present wash arch is configured as a curve spanning over the path of travel between two side supports. The nozzles are oriented to spray radially inward of the curved arch. As a result, all of the nozzles are directed toward the vehicle, regardless of the vehicle size.

In a preferred environment, the arch consists of a pair of side supports along the two longitudinal sides of the vehicle path of travel. A flexible pipe is attached to the supports on each side, and curves upward above the supports and over the vehicle path. The spray nozzles are mounted directly to the pipe and are in fluid communication with the pipe interior to receive the spray fluid. Preferably the pipe is made of PVC and is flexible so that permanent preforming of the pipe into a curve shape is not required. The flexible PVC pipe is hand manipulated to bend the pipe to form the arch. The attachment of the pipe to the two side supports holds it in place.

The attachment of the side supports to the pipe is at a height within the range of 40–60 percent of the overall height of the arch from the vehicle floor. Preferably, the pipe extends downward from the uppermost attachment along the support toward the wash system floor. Nozzles along the two sides are directed toward the sides of the vehicle being washed. The pipe is preferably attached to the side supports at multiple vertically-spaced locations on each side. The pipe may curve along the sides at a different radius from the curvature above the two supports. Along the two sides the pipe will typically have a larger radius of curvature.

The arch can be constructed of one or more pipes extending between the two side supports. If multiple pipes are used, the pipes are coupled together along the curved arch at various locations between the two side supports to enhance the stiffness of the arch and prevent it from bending forward or rearward along the vehicle path of travel.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
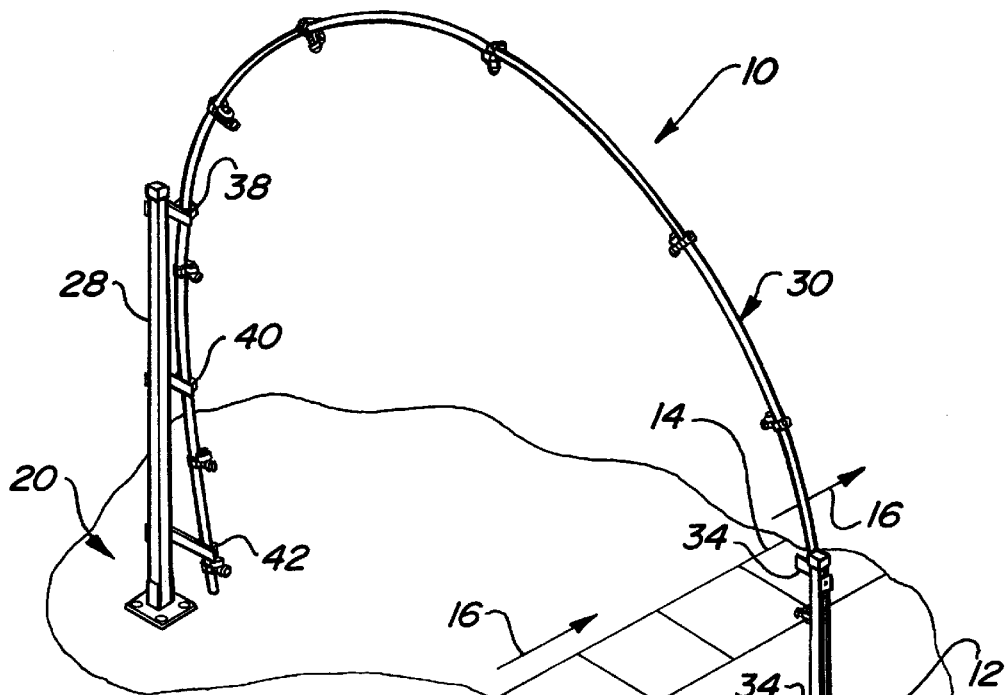
FIG. 1 is a perspective view of a vehicle wash system spray arch of the present invention utilizing a single pipe.

The spray arch of the present invention is shown in FIG. 1 and is designated generally as 10. The spray arch 10 is disposed within a vehicle wash system having a floor 12. A center trough covered by grate 14 is formed in the floor and receives water and debris from the car wash. Floor 12 typically slopes down to the center trough. The car wash system defines a path of travel for a vehicle to be washed shown by the arrows 16. The center trough typically runs longitudinally along the vehicle path of travel. The longitudinal edge 18 is referred to as a right-side edge while the edge 20 is the left-side edge for purposes of distinguishing one side edge from the other.

The arch 10 includes a right support 26 and a left support 28 attached to the floor 12 and extending upwardly therefrom. Typically, the supports are placed upon the floor 12. They could, however, be attached to the walls of the vehicle wash building.

The arch further includes a pipe 30 which is attached to the supports 26 and 28 and extends upwardly above the supports and arches over the path of travel in a curved shape. The pipe 30 is attached to the support 26 at attachments 32, 34 and 36. Likewise, the pipe 30 is attached left support 28 by attachments 38, 40 and 42. The upper attachments 32 and 38 are located at roughly the mid-point between the floor and the top of the arch 10 in a preferred embodiment. Typically, the upper attachment will be located at a height within the range of 40–60 percent of the overall height of the arch. The pipe 30 forms a continuous curve from the upper attachment of one side over the path of travel to the attachment at the other side. The term "continuous curve" is used to mean that the pipe does not have a straight portion between the two supports. The radius of curvature may vary over the length of the arch.

In a preferred embodiment, the pipe 30 is a flexible PVC pipe such that no preforming of the pipe is required. If a metal pipe is used, it must be bent in a forming operation prior to attachment to the supports. Use of flexible PVC pipe avoids the need for a metal preforming operation. The arch is installed by attaching the pipe to one side support and then bending the pipe by hand manipulation and attaching it to the other side support.

Figure 3:
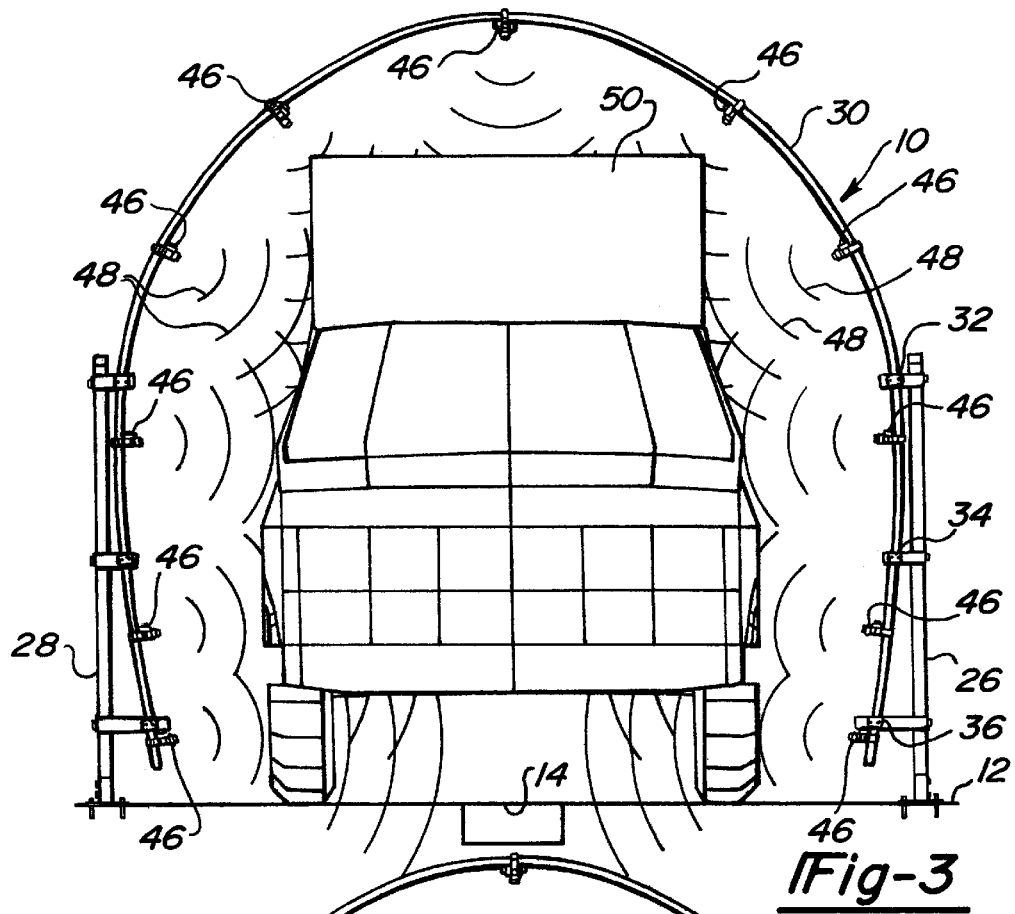
FIG. 3 is a front view of the arch looking longitudinally down the car wash with a large vehicle passing beneath the arch.
Figure 4:
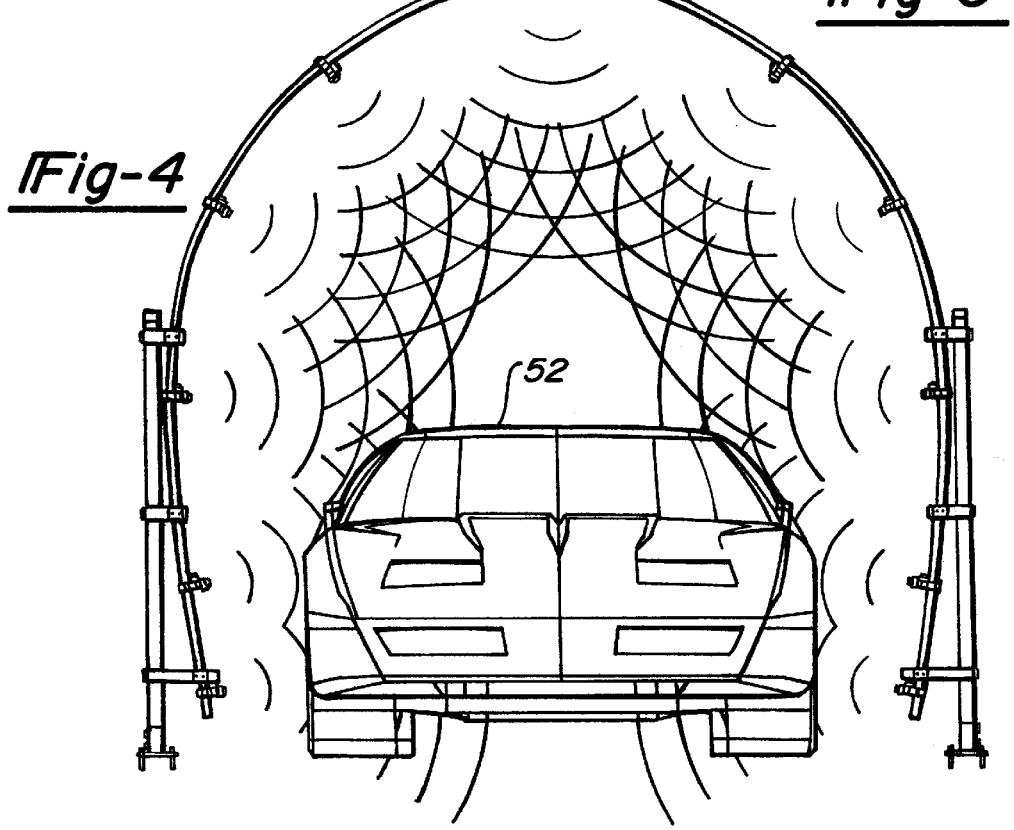
FIG. 4 is a front view of the arch similar to FIG. 3 with a small vehicle passing beneath the arch.

The multiple attachments of the pipe on each side support improves the lateral stiffness of the arch. This prevents tipping the pipe forward or rearward in the longitudinal direction of the path of travel. Another purpose for multiple attachments on each support is to vary the radius of curvature of the pipe along the two sides. As shown in FIGS. 3 and 4, the two side portions of the pipe along the supports have a larger radius of curvature than the arch portion over the path of travel.

A plurality of spray nozzles 46 are mounted to the pipe 30 and are in fluid communication with the pipe interior to receive spray liquids from the pipe. The nozzles 46 are oriented to direct liquid spray from the pipe 30 radially inward from the curved pipe 30 toward a vehicle as shown in FIGS. 3 and 4. The spray pattern is shown by the curved lines 48 increasing in size from each of the nozzles. By directing the nozzle spray radially inward, the nozzles are always directed toward a passing vehicle such as a large van-type vehicle 50 shown in FIG. 3, as well as a shorter car 52 as shown in FIG. 4. Regardless of the vehicle's size, the liquid spray is always directed toward the vehicle's surface. While the shorter car 52 is further from the upper nozzles of the arch, as the distance from the nozzles increases, so does the extent of spray overlap. The spray overlap results in each unit area of the smaller vehicle's surface receiving a greater quantity of liquid than the larger vehicle 50. The increased quantity of liquid per unit area at least partially compensates for the increased distance from the nozzle.

Figure 2:
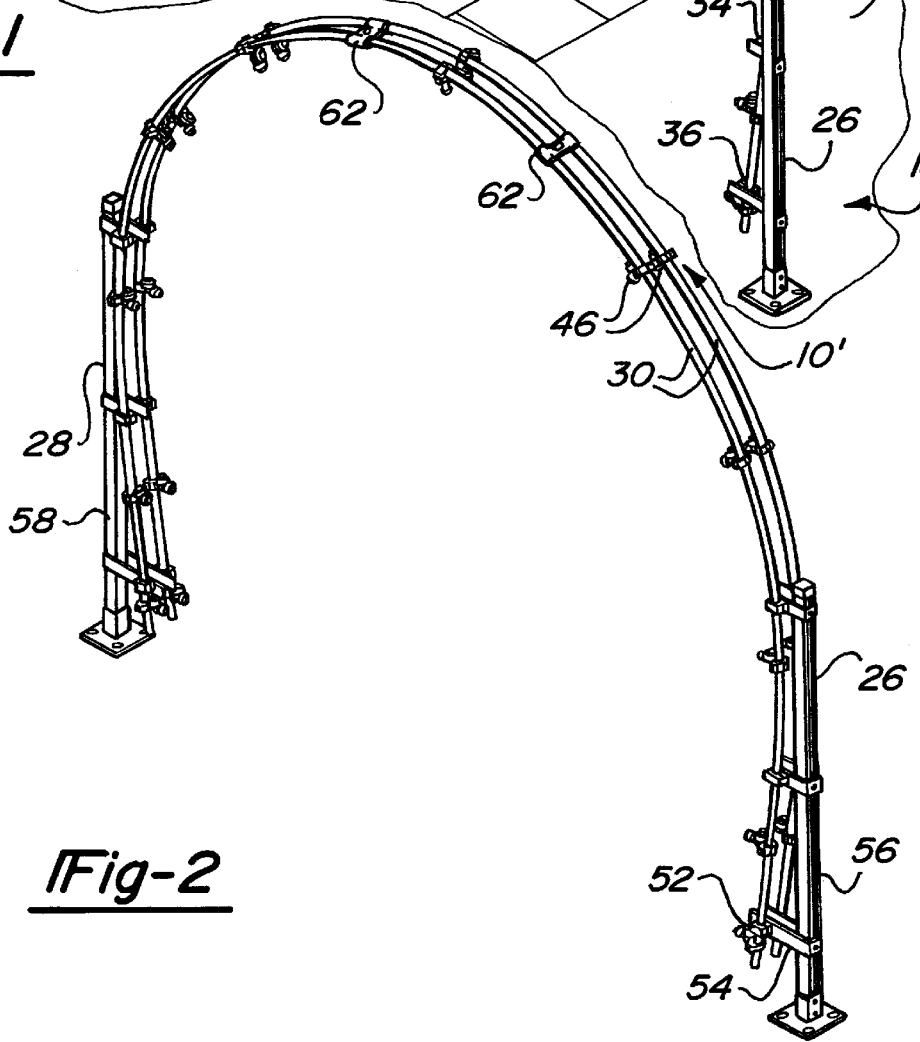
FIG. 2 is a perspective view like FIG. 1 of a spray arch utilizing two pipes.

With reference to FIG. 2, a spray arch 10' is shown. The arch 10' is essentially identical to the arch 10 with the provision of a pair of pipes 30, each carrying a plurality of nozzles 46. The provision of two pipes can provide for a greater quantity of wash fluid to be discharged onto the vehicle. In addition the nozzles 46 on one pipe 30 can be oriented slightly upstream while the nozzles 46 of the other arch oriented somewhat downstream relative to the vehicle path. This enables the front and rear surfaces of the vehicle to receive a greater degree of impact from the sprayed fluid. The two pipes are attached to one another by brackets 62. By attaching the pipes to one another over the arch, the lateral stiffness of the arch is increased and prevents tipping. In addition, if the nozzles are oriented slightly upstream and downstream of the path of travel, the connection of the two pipes along the arch balances the lateral forces acting on the pipes.

The attachments 32–42 are formed by split blocks 52 each having two portions with semi-cylindrical recesses. The two portions are screwed together to surround the pipe 30. The split block 52 is attached to a bracket 54 which is in turn attached to a posts 56 and 58 of the supports 26 and 28 respectively.

One advantage of the arches 10 and 10' is that the various components of the arches are widely available, off-the-shelf components. As a result, the arch is relatively low in cost compared to a spray arch of custom-made components.

The spray arch of the present invention, by spanning over the vehicle in a continuous curve, provides for an arch in which the nozzles are all directed radially inward toward the vehicle surface, regardless of the size of the vehicle. In addition, when formed of flexible pipe such as a PVC pipe, the pipe does not need to be preformed as in the case with metal piping. This facilitates the manufacture and assembly of the arch enabling a straight PVC pipe to be used which is readily available and easily transported. In addition, a replacement pipe can be constructed without the need for precisely pre-bending the pipe to fit the supports already installed in the vehicle wash.

It is to be understood that the invention is not limited to the exact construction illustrated and described above, but that various changes and modifications may be made without departing from the spirit and scope of the invention as defined in the following claims.

We claim:

1. A spray arch for use in a vehicle wash system having a floor and defining a path of travel for vehicles being washed, the path of travel having left and right side longitudinal sides, the spray arch comprising:

a left support and a right support extending above the floor on the left and right sides of the path of travel respectively;

a liquid pipe attached to the supports and extending upward above the supports in a continuous curve to span over the path of travel to enable a vehicle moving along the path of travel to pass beneath the pipe; and spray nozzles mounted to the pipe in liquid communication with the pipe interior and oriented to spray toward a vehicle moving beneath the arch.

2. The arch of claim 1 wherein the nozzles are oriented to spray radially inward from the curved shape of the pipe.

3. The arch of claim 1 wherein the curved shape of the pipe between the supports is approximately circular.

4. The arch of claim 1 wherein the supports are attached to the pipe at a height of approximately 40 to 60 percent of the total height of the arch above the floor.

5. The arch of claim 1 wherein the pipe extends downward along each side of the path and is attached to each support at multiple locations with the upper attachment being located at a height of approximately 40 to 60 percent of the total height of the arch above the floor with additional spray nozzles along the pipe below the upper attachment to spray the sides of vehicles moving along the path of travel.

6. The arch of claim 1 having a pair of pipes attached to the supports and extending upward above the supports in a curved shape to span over the path of travel to enable a vehicle moving along the path of travel to pass beneath the conduit with spray nozzles mounted to each pipe in liquid communication with the pipe interior and oriented to spray toward a vehicle moving beneath the arch.

7. The arch of claim 6 further comprising means for coupling the two pipes to one another at spaced locations along the length of each pipe.

8. The arch of claim 1 wherein the pipe is flexible to be hand manipulated into the curved shape between the supports when attaching the pipe to the supports to avoid the need to pre-form the pipe into the curved shape.

9. The arch of claim 8 wherein the pipe is made of PVC.

10. A spray arch for use in a vehicle wash system having a floor and defining a path of travel for vehicles being washed, the path of travel having left and right side longitudinal sides, the spray arch comprising;

a left support and a right support extending above the floor on the left and right sides of the path of travel respectively;

a liquid pipe extending upward above the supports in a curved shape to span over the path of travel to enable a vehicle moving along the path of travel to pass beneath the pipe, the pipe being attached to the supports at multiple vertically spaced locations to hold the pipe in place along the sides of the path of travel; and spray nozzles mounted to the pipe in liquid communication with the pipe interior and oriented to spray toward a vehicle moving beneath the arch.

11. The arch of claim 10 wherein the pipe is flexible to be hand manipulated into the curved shape between the supports when attaching the pipe to the supports to avoid the need to pre-form the pipe into the curved shape.

12. The arch of claim 11 wherein the pipe is made of PVC.

13. The arch of claim 10 wherein the nozzles are oriented to spray radially inward relative to the curved shape of the pipe.

* * * * *